UNITED STATES PATENT OFFICE.

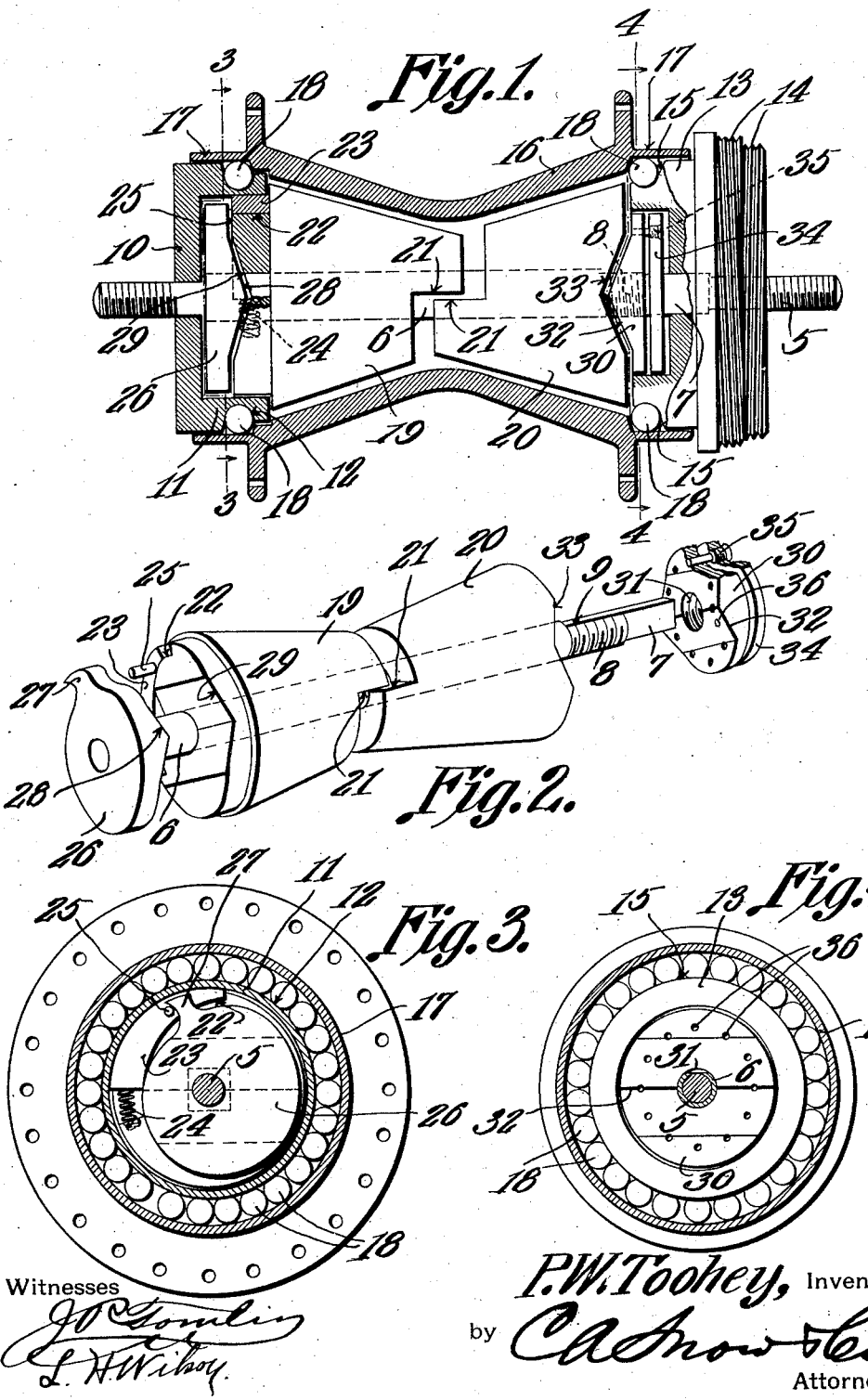

PATRICK W. TOOHEY, OF COLORADO SPRINGS, COLORADO, ASSIGNOR TO THE TOOHEY-DOOLITTLE COMPANY, OF COLORADO SPRINGS, COLORADO.

COASTER-BRAKE.

1,025,598.   Specification of Letters Patent.   Patented May 7, 1912.

Application filed March 10, 1911. Serial No. 613,516.

*To all whom it may concern:*

Be it known that I, PATRICK W. TOOHEY, a citizen of the United States, residing at Colorado Springs, in the county of El Paso and State of Colorado, have invented a new and useful Coaster-Brake, of which the following is a specification.

It is the object of the present invention to provide a novel mechanism whereby, through the manipulation of the pedals of a bicycle, a pair of slidably mounted cone members may be made operative to effect either a forward drive, or a braking effect against the forward rotary movement of the hub of the wheel.

A further feature of the invention resides in embodying the drive and brake mechanism in a single assemblage of elements.

In the accompanying drawings—Figure 1 is a view partly in elevation and partly in vertical longitudinal section showing the brake embodying the present invention. Fig. 2 is a perspective view illustrating the parts of the brake, with the exception of the hub, in position to be assembled. Fig. 3 is a vertical sectional view on the line 3—3 of Fig. 1 looking in the direction indicated by the arrows. Fig. 4 is a similar view on the line 4—4 of Fig. 1 looking in the direction indicated by the arrows.

In the drawings, there is shown a spindle 5 which is fixed with respect to the other elements of the coaster brake and is secured at its ends in the rear forks of the bicycle or the motor cycle in the same manner as the ordinary rear wheel spindle of such vehicles. Fitted loosely upon the spindle 5 is a hollow spindle 6 which, at one end, is squared as at 7 and inwardly of its said end is threaded as at 8 and flattened on one side as at 9. Fixed upon the fixed spindle 5 adjacent one end thereof and immediately outwardly of the adjacent end of the hollow spindle 6 is a bearing cone 10 including a flange 11 formed with a circumscribing ball race 12. A similar cone 13 is fixed upon the squared end 7 of the hollow spindle 6 and has the usual threaded extension 14 upon which is mounted the usual sprocket (not shown). The bearing cone 13 is also formed with a ball race indicated by the numeral 15 and a hub 16 is formed at its ends with flanges 17 which fit over the bearing cones 10 and 13 as clearly shown in Fig. 1 of the drawings, bearing balls 18 being arranged in the ball races in the two bearing cones for the purpose of reducing friction between the hub and the said cones. It will be observed at this point that the hub is free to rotate independent of both of the bearing cones and that it is in the form of a hollow double cone.

Mounted upon the hollow spindle 6 for free sliding movement and for free rotary movement is a friction cone 19 and a similar cone 20. These two cones at their opposed or minor ends are shouldered as at 21 whereby they will be held for rotation one with the other and against independent rotation. It will be observed at this point from an inspection of Fig. 1 of the drawings, that when the two cones 19 and 20 are moved toward each other, they will frictionally bind against the inner surface of the hub shell 16 and at such time will be held for rotation with the said hub. The outer or major end of the friction cone 19 is slightly reduced and this reduced end of the friction cone is cut away as at 22, eccentrically, and has fitted in its cut away portion a wedge 23 which is crescent shaped and has bearing against one of its ends a spring 24 interposed there between and one shoulder formed by cutting away the said end of the cone 19. The spring 24 normally holds the wedge 23 moved in a direction to bind between the wall of the cut away portion 22 of the friction cone, and the inner surface of the annular flange 11 of the bearing cone 10 so that when the parts of the device are at rest or in normal condition, the cone 19 will be held clutched with the bearing cone 10 and consequently against rotation upon the spindle 6. For a purpose to be presently explained, a pin 25 projects laterally from the wedge 23 near the minor end thereof.

Fixed upon the hollow spindle 6 at that end adjacent the bearing cone 10, is a cam member 26 having a finger 27 upon its periphery and formed upon its inner face with a cam portion 28. The reduced end of the friction cone 19 is formed with a recess 29 having anti-clinal walls and the cam portion 28 of the member 26 projects into this recess 29 and coöperates with the said walls thereof when the spindle 6 is rotated in either direction. A cam member 30 is formed with an opening 31 and is fitted upon the threaded portion 8 of the hollow spindle 6 and is formed upon its inner face with a cam portion 32 projecting into a recess 33 formed in the adjacent end of the friction cone 20. The recess 33 has anticlinal walls as has the recess 29 and the cam portion 32 coöperates with these walls in the same manner as does the portion 28 of the first described cam member. It will be understood that the cam member 30 is rotatably adjustable upon the spindle 6 or more specifically the portion 8 thereof and slidable upon the portion 7 of the spindle is a disk 34 having a stud screw 35 threaded therethrough and projecting into one of a number of openings 36 formed in the outer face of the cam member 30. It will be readily understood that by sliding the disk 34, the stud screw having been removed, the cam member 30 may be moved by rotation along the part 8 to the desired point after which the stud screw is again inserted through the disk 34 and, by reason of the fact that it then projects into one of the openings 36, holds the disk against backward rotation and consequently holds the cam member at adjustment.

Presupposing that the parts are positioned as shown in Fig. 1, the operation of the device is as follows:—When the hollow spindle 6 is rotated forwardly, the finger 27 of the cam member 26 will engage the pin 25 of the wedge 23 and move the wedge 23 forwardly, putting the spring 24 under tension. When the wedge 23 is thus moved, the cone 19 will be freed from the flange 11 of the bearing member 10. The aforementioned rotation of the hollow spindle 6 will rotate the cam members 26 and 30, their cam portions 28 and 32, respectively, engaging with the anti-clinal walls of the recesses in the ends of the cones 19 and 20. The cones 19 and 20 will be forced together, and they will engage frictionally with the hub shell 16. The hub shell 16 will thus be driven forwardly, along with the spindle 6. Suppose now, that the operator ceases to pedal. Under such circumstances, the cam member 26 will remain at rest, and the cones 19 and 20 will rotate forwardly through a very small arc, along with the hub shell 16. This slight rotation of the cones 19 and 20 in a forward direction will take place without the cones 19 and 20 being jammed more tightly against the hub shell 16, because some space exists between the face 28 of the cam member 26 and the face 29 of the cone 19 upon the one hand, and between the face 33 of the cone 20 and the face 32 of the cam member 30 upon the other hand. The slight forward rotation of the cone 19 will move the pin 25 on the wedge 23 away from the finger 27 of the cam member 26. The wedge 23 will then be actuated by the spring 24 and will bind the cone 19 to the flange 11 of the fixed bearing 10, so that the cone 19, and consequently the cone 20, cannot longer rotate with the hub shell 16. A forced release of the cones 19 and 20 from the hub shell 16 will thus be effected. This forced release of the cones 19 and 20 from the hub shell 16, will give the cones an endwise movement in opposite directions, and it is to be noted that this endwise movement of the cones need be but slight—almost imperceptible in effect. The wedge 23 will not prevent this endwise movement of the cones 19 and 20, for the reason that, although the wedge 23 exerts great power to prevent a rotation of the cone 19, the ability of the wedge to prevent the endwise movement of the cone is but slight, since the wedging effect of the member 23 takes place longitudinally of said member, and not transversely thereof. Suppose, again, that the operator starts to back-pedal. Under such circumstances, the cam faces 28 and 32 of the member 26 and 30, coöperate with the anticlinal walls in the ends of the cones 19 and 20, respectively, will force the said cones endwise, and toward each other, until they grip the hub shell 16, it being recalled, as aforesaid, that the wedge 23 exerts but little power tending to prevent an endwise movement of the cones 19 and 20. However, as soon as the cones 19 and 20 start to rotate rearwardly, the wedge 23 will exercise its obvious function, the wedge binding the cone 19 tightly, against rearward rotation, the cones being held against forward rotation, by the engagement between the cam members 26 and 30, and the cones. The cones 19 and 20 will therefore exert a strong braking action against the forward rotation of the hub shell 16.

What is claimed is:

1. In a coaster brake, a fixed spindle, a hollow spindle loose upon the fixed spindle, friction cones loosely mounted upon the hollow spindle, a hub inclosing the cones, the cones being arranged to coöperate with the hub when moved toward each other, cam means fixed upon the hollow spindle for moving the cones toward each other; and means upon the hollow spindle for driving the same.

2. In a coaster brake, a fixed spindle, a hollow spindle loose upon the fixed spindle, friction cones loosely mounted upon the hollow spindle, a hub inclosing the cones, the cones being arranged to coöperate with the hub when moved toward each other, means upon the hollow spindle for driving the same, and means fixed upon the hollow spindle arranged to move the cones toward each other when the hollow spindle is rotated in either direction.

3. In a coaster brake, a fixed spindle, a hollow spindle loose upon the fixed spindle, friction cones loosely mounted upon the hollow spindle, a hub inclosing the cones, the cones being arranged to coöperate with the hub when moved toward each other, means upon the hollow spindle for driving the same, and means fixed upon the hollow spindle upwardly of each cone arranged to move the cones toward each other when the hollow spindle is rotated in either direction.

4. In a coaster brake, a fixed spindle, a hollow spindle loose upon the fixed spindle, friction cones loosely mounted upon the hollow spindle, a hub inclosing the cones, the cones being arranged to coöperate with the hub when moved toward each other, means fixed at one end of the hollow spindle arranged to move one of the cones toward the other cone when the spindle is rotated in either direction, adjustable means upon the hollow spindle outwardly of the other cone arranged to similarly move the same when the spindle is so moved; and means upon the hollow spindle for driving the same.

5. In a coaster brake, a fixed spindle, a hollow spindle loose upon the fixed spindle, friction cones loosely mounted upon the hollow spindle, a hub inclosing the cones, the cones being arranged to coöperate with the hub when moved toward each other, means upon the hollow spindle for driving the same, the cones being formed in their outer ends with recesses having anti-clinal walls, and means fixed upon the hollow spindle having cam portions seating in the recesses and coöperating with the walls whereby to move the cones toward each other when the spindle is rotated in either direction.

6. In a coaster brake, a fixed spindle, a hollow spindle loose upon the fixed spindle, friction cones loosely mounted upon the hollow spindle, a hub inclosing the cones, the cones being arranged to coöperate with the hub when moved toward each other, the cones being formed in their outer ends with recesses having anti-clinal walls, a cam member fixed upon the hollow spindle and coöperating with the walls of the recess in one of the cones, a cam member adjustably mounted upon the hollow spindle and coöperating with the walls of the recess in the other cone, whereby to move the cones toward each other when the spindle is rotated in either direction; and means upon the hollow spindle for driving the same.

7. In a coaster brake, a fixed spindle, a hollow spindle loose upon the fixed spindle, friction cones loosely mounted upon the hollow spindle, a hub inclosing the cones, the cones being arranged to coöperate with the hub when moved toward each other, means upon the hollow spindle for driving the same, the cones being formed in their outer ends with recesses having anti-clinal walls, a cam member fixed upon the spindle and coöperating with the walls of the recess of one cone, a cam member adjustable upon the spindle and coöperating with the walls of the recess in the other cone, and means slidably adjustable upon the hollow spindle and holding the last mentioned cam member at adjustment thereon.

8. In a coaster brake, a fixed spindle, a hollow spindle loose upon the fixed spindle, friction cones loosely mounted upon the hollow spindle, a hub inclosing the cones, the cones being arranged to coöperate with the hub when moved toward each other, means upon the hollow spindle for driving the same, the cones being formed in their outer ends with recesses having anti-clinal walls, a cam member fixed upon the spindle and coöperating with the walls of the recess in one cone, a cam member threaded upon the hollow spindle and coöperating with the walls of the recess in the other cone, a disk slidable upon the hollow spindle in juxtaposition to the last mentioned cam member, and a stud carried by the said disk and engaging interchangeably in openings in the said cam member.

9. In a coaster brake, a fixed spindle, a hollow spindle loose upon the fixed spindle, friction cones loosely mounted upon the hollow spindle, and having interengaging elements adapted to secure a simultaneous rotation of the cones, a hub inclosing the cones, the cones being arranged to coöperate with the hub when moved toward each other, means upon the hollow spindle for driving the same, means fixed upon the hollow spindle arranged to move the cones toward each other when the hollow spindle is rotated in either direction, a bearing cone fixed upon the fixed spindle, and means upon one of the cones arranged to coöperate with the bearing cone whereby to hold the friction cones against rotation in one direction when out of coöperative engagement with the hub.

10. In a coaster brake, a fixed spindle, a hollow spindle loose upon the fixed spindle, friction cones loosely mounted upon the hollow spindle, and having interengaging elements adapted to secure a simultaneous rotation of the cones, a hub inclosing the cones, the cones being arranged to coöperate with the hub when moved toward each other, means upon the hollow spindle for driving the same, means fixed upon the hollow spindle arranged to move the cones toward each other when the hollow spindle is rotated in either direction, a bearing cone carried by the fixed spindle, and a friction clutch carried by one of the friction cones and arranged for coöperation with the bearing cone whereby to hold the friction cones against rotation in one direction when out of coöperative engagement with the hub.

11. In a coaster brake, a fixed spindle, a hollow spindle loose upon the fixed spindle, friction cones loosely mounted upon the hollow spindle, and having interengaging elements adapted to secure a simultaneous rotation of the cones, a hub inclosing the cones, the cones being arranged to coöperate with the hub when moved toward each other, means upon the hollow spindle for driving the same, the said friction cones at their outer ends being formed with recesses having anti-clinal walls, a cam member fixed upon the hollow spindle and coöperating with the walls of the recess in one of the friction cones, a cam member fixed upon the said hollow spindle and coöperating with the walls of the recess in the other friction cone, a bearing cone fixed upon the fixed spindle, means carried by one of the cones for clutching the same with the fixed bearing cone, when the friction cones are out of coöperative engagement with the hub, and means upon the first mentioned cam member for coöperation with the said clutch means to release the same upon rotation of the hollow spindle in one direction.

In testimony that I claim the foregoing as my own, I have hereto affixed my signature in the presence of two witnesses.

PATRICK W. TOOHEY.

Witnesses:
FRED F. HORN,
JOHN J. O'DONNELL.

Copies of this patent may be obtained for five cents each, by addressing the "Commissioner of Patents, Washington, D. C."